United States Patent [19]

Maguire

[11] Patent Number: 4,881,422

[45] Date of Patent: Nov. 21, 1989

[54] ANTI-LASH GEAR MECHANISM

[75] Inventor: Joel M. Maguire, Dearborn, Mich.

[73] Assignee: General Motors Corporation, Detroit, Mich.

[21] Appl. No.: 232,072

[22] Filed: Aug. 15, 1988

[51] Int. Cl.$^4$ .............................................. F16H 55/18
[52] U.S. Cl. ........................................ 74/440; 74/409
[58] Field of Search .................................. 74/409, 440

[56] References Cited

U.S. PATENT DOCUMENTS

| | | | |
|---|---|---|---|
| 1,748,820 | 2/1930 | Alexandrescu | 74/440 |
| 2,896,466 | 7/1959 | Wiseman | 74/440 |
| 3,174,356 | 3/1965 | Michalel | 74/440 |
| 4,519,264 | 5/1985 | Inui | 74/440 X |
| 4,577,525 | 3/1986 | Ikemoto et al. | 74/440 |

FOREIGN PATENT DOCUMENTS 62-20964  1/1987  Japan ........................ 74/440

Primary Examiner—Allan D. Herrmann
Attorney, Agent, or Firm—Donald F. Scherer

[57] ABSTRACT

An anti-lash gear mechanism is provided to reduce the noise in a gearing system. The anti-lash mechanism has a gear member disposed for rotation axially adjacent one of the power transmitting gears in a gearing system. The anti-lash gear has one more tooth on the periphery than the power transmitting gear and the anti-lash gear is disposed in frictional engagement with the power transmitting gear. When another power transmitting gear meshes with this combination of gears, the anti-lash gear remains in mesh with the drive gear until the next successive gear tooth on the driven gear is engaged. The frictional contact prevents the drive gear from accelerating to engage the drive gear from the driven side. This gear mesh causes the anti-lash gear to rotate relative to the power transmitting gear until complete meshing of the two power transmitting gears is attained. In one embodiment of the invention, a centrifugal mechanism is provided to reduce the frictional engagement at high gear speeds where anti-lash meshes are not required.

2 Claims, 1 Drawing Sheet

ANTI-LASH GEAR MECHANISM

BACKGROUND OF THE INVENTION

This invention relates to gear systems and more particularly to gear systems wherein anti-lash mechanisms are employed.

In prior art lash prevention gearing, it is known to have an anti-lash gear member held in frictional contact with a driven working gear member. The anti-lash gear generally has at least one tooth more than the driven working gear. This assures that contact will be made between the teeth of the driving working gear and the anti-lash gear prior to meshing with the driven working gear. This eliminates gear rattle under low speed no load conditions such as "neutral idle" in a power transmission.

The frictional contact permits relative motion between the anti-lash gear and the driven working gear while the driving gear remains subject to rotary resistance. These devices have been found useful in countershaft type constant mesh transmissions. These prior art devices exhibit two disadvantages. The friction contact between the gears is unreduced throughout the speed range of the system and a separate spring member is used to establish the frictional connection. The anti-lash mechanisms are generally useful only at low vehicle speeds and the separate spring member adds complexity.

SUMMARY OF THE INVENTION

The present invention seeks to overcome the disadvantages of the prior art by providing a mechanism for anti-lash gear systems which will release or greatly reduce the frictional contact within the gear system at high shaft speeds and, in at least one embodiment of the invention, by providing a spring structure integral with the anti-lash gear.

The speed releasing mechanism can take many forms. A counterweight or flyweight can be positioned to act on the spring thereby reducing the normal loading of the friction surfaces as gear speed increases. The anti-lash gear can have the inner portion thereof formed as a Belleville or washer type spring such that at higher gear speeds, the spring will tend to flatten and thereby permit separation of the friction surfaces. The latter structure also eliminates the need for a separate spring.

It is therefore an object of this invention to provide an improved anti-lash gear wherein a lash control gear member is urged into frictional engagement with a working gear by a spring member at low rotary speeds, and wherein the force of the spring member is reduced as the rotary speed increases, thereby reducing the frictional engagement.

It is another object of this invention to provide an improved anti-lash gear mechanism wherein the lash control member has a gear portion urged into frictional engagement with a working gear by an integral spring portion formed on the lash control member.

It is a further object of this invention to provide an improved anti-lash gear mechanism wherein a toothed control member has an integral spring portion urging friction contact between the control member and a working gear, and also wherein the control member is response to centrifugal force imposed thereon to reduce the spring urged frictional contact at elevated rotary speeds.

These and other objects and advantages of the present invention will be more apparent from the following specification and drawings.

DESCRIPTION OF EXEMPLARY EMBODIMENTS

Figure 1:
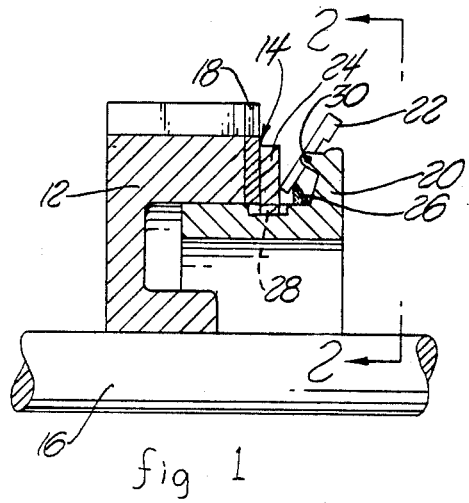
FIG. 1 is a sectional elevational view of a gear mechanism incorporating the present invention.
Figure 2:
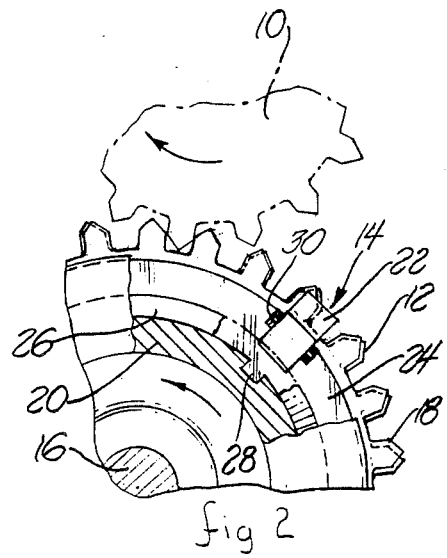
FIG. 2 is a view taken along line 2—2 of FIG. 1.

Referring to the drawings, wherein like characters represent the same or corresponding parts throughout the several views, there is seen in FIGS. 1 and 2 a gearing system having a driving gear 10, a driven gear 12 and an anti-lash mechanism 14. The driving gear 10 is driven by a power input shaft, not shown, and the driven gear 12 is drivingly connected to a power output shaft 16.

The anti-lash mechanism 14 includes an anti-lash or control gear 18, a reaction member 20, a plurality of flyweights 22, a bearing member 24 and a spring member 26. The reaction member 20 is pressfit into or otherwise secured with the driven gear 12. The bearing member 24 is drivingly connected with the reaction member 20 through a plurality of tangs, such as 28. Therefore, the reaction member 20 and bearing member 24 rotate continuously with the gear 12.

The control gear 18 is rotatably mounted on the reaction member 20 and is maintained in frictional engagement with the driven gear 12 by the spring 26 acting through the flyweight 22 and the bearing 24. The assembled friction load between the control gear 18 and the driven gear 12 is established by controlling the dimension to which the reaction member 20 is pressfit into the driven gear 12.

The control gear 18 has one tooth more on its outer periphery than does the driven gear 12. This is best seen in FIG. 2 where meshing between the drive gear 10, driven gear 12 and control gear 18 is shown. During low rotary speeds, the drive gear 10 and driven gear 12 have a tendency to separate at the tooth mesh because of the clearances therebetween and the low resistance loads present at the driven gear 12. With the control gear 18 in position, the drive gear 10 is maintained in meshing contact therewith due to the difference in tooth spacing of the teeth on the gear 12 and gear 18. Since the control gear 18 is in frictional engagement with the driven gear 12, the driven gear 12 will be retarded from movement relative to the drive gear 10. This anti-lash prevention is generally not needed as the rotary speed of the gears increase or as the load on the power output shaft 16 increases.

The structure shown in FIGS. 1 and 2 will reduce the frictional engagement between the control gear 18 and the driven gear 12 as the rotary speed of the driven gear 12 increases. This is accomplished by a plurality of flyweights, such as that shown at 22, which are angularly spaced and pivotally mounted on the reaction member 20. As the rotary speed of the gear 12 increases, the flyweight 22, as seen in FIG. 1, will attempt to rotate counterclockwise about a pin 30 which pivotally mounts the flyweight 22 on reaction member 20.

The counterclockwise rotation of the flyweight 22 will result in a reduction on the amount of spring force from spring 26 being transmitted to the bearing 24 and therefore control gear 18. As the effective spring force on the control gear 18 is reduced, the frictional engagement between gears 18 and 12 will reduce. If the gear 12 is rotated sufficiently fast, the flyweight 22 will assume a position substantially parallel to the control gear 18 and the friction force will be reduced to substantially zero.

Figure 3:
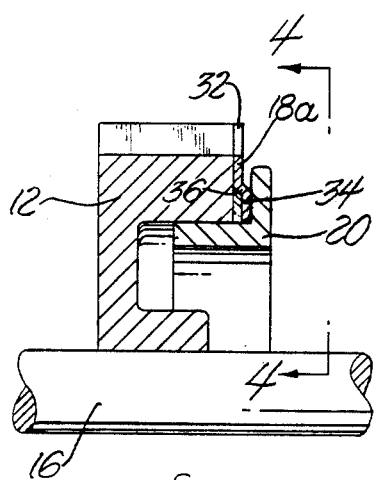
FIG. 3 is a view similar to FIG. 1 depicting another embodiment of the invention.
Figure 4:
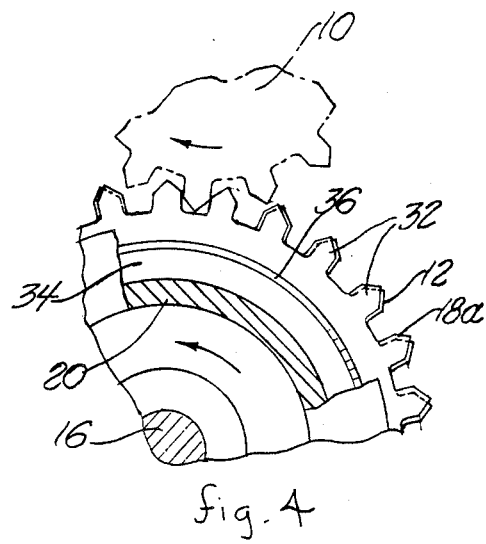
FIG. 4 is a view taken along line 4—4 of FIG. 3.

The structure shown in FIGS. 3 and 4 differs from the structure of FIGS. 1 and 2 in that a control gear 18a is formed with a gear portion 32, a reaction portion 34 and a spring portion 36. The reaction portion 34 abuts the reaction member 20 while the gear portion 32 abuts the driven gear 12. The spring portion 36 which is formed integrally with the portions 32 and 34 urges frictional contact between the gear portion 32 and the driven gear 12 and the reaction portion 34 and reaction member 20. The mechanism described for FIGS. 3 and 4 will not provide significant frictional force reduction at higher gear speeds. Such a system might be found useful when low inertia gears are used or where relatively light loads are established on the power output shaft 16 at higher speeds.

Figure 5:
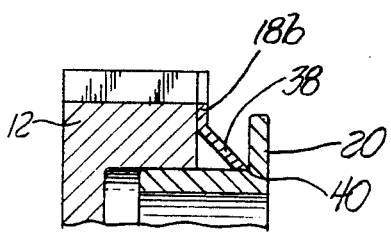
FIG. 5 is a partial view similar to FIG. 1 depicting a third embodiment of the present invention.

In the embodiment shown in FIG. 5, a control gear member 18b has the radially inward portion 38 which is constructed to perform as a Belleville or washer spring. The frictional load between the control member 18b and the driven gear 12 is also established by the amount of pressfit between the reaction member 20 and the driven gear 12. However, in the embodiment depicted in FIG. 5, the radially outer portion of control member 18b will tend to pivot clockwise about a contact point 40 on the inner portion 38 and tend to flatten the Belleville spring portion 38. This flattening tendency will reduce the friction load between the gear 12 and the control member 18b.

Some frictional resistance to relative rotation between the gear 12 and control member 18b will remain due to the contact at the pivot point 40. However, the overall frictional resistance will be greatly reduced at higher gear speeds.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A lash removal apparatus for gearing comprising: a driven gear having a predetermined number of teeth and being operatively connected with a torque delivery means for transmitting torque; an anti-lash gear rotatably supported adjacent said driven gear and having a predetermined number of teeth at least one greater than the number of teeth on said driven gear; gear means meshing with said driven gear and said anti-lash gear and being forced into engagement between and with respective teeth on said driven gear and said anti-lash gear due to the tooth differential therebetween; resilient means for applying a force for urging said anti-lash gear into frictional engagement with said driven gear for encouraging conjoint rotation thereof and for maintaining engagement with said gear means; and speed responsive means for urging said resilient means to reduce said applying force when the speed of the driven gear increases above a predetermined value to reduce the engagement force.

2. A lash removal apparatus for gearing comprising: a driven gear having a predetermined number of teeth and being operatively connected with a torque delivery means for transmitting torque; an anti-lash gear rotatably supported adjacent said driven gear and having a gear portion with a predetermined number of teeth at least one greater than the number of teeth on said driven gear; gear means meshing with said driven gear and said anti-lash gear and being forced into engagement between and with respective teeth on said driven gear and said anti-lash gear due to the tooth differential therebetween; and resilient means formed integrally with said anti-lash gear for applying a force for urging said anti-lash gear into frictional engagement with said driven gear for encouraging conjoint rotation thereof and for maintaining engagement with said gear means and said resilient means being formed radially inward of said gear portion and being responsive to centrifugal forces imposed on said gear portion to reduce the force applied.

* * * * *